(12) United States Patent
Johannsen et al.

(10) Patent No.: US 7,897,698 B2
(45) Date of Patent: Mar. 1, 2011

(54) METHOD OF MODIFYING A MACROMOLECULAR SYSTEM

(75) Inventors: Ib Johannsen, Vaerlose (DK); Roice Michael, Frederiksberg (DK)

(73) Assignee: Novo Nordisk A/S, Bagsvaerd (DK)

( * ) Notice: Subject to any disclaimer, the term of this patent is extended or adjusted under 35 U.S.C. 154(b) by 126 days.

(21) Appl. No.: 11/990,455

(22) PCT Filed: Aug. 25, 2006

(86) PCT No.: PCT/DK2006/000461
§ 371 (c)(1),
(2), (4) Date: Apr. 13, 2009

(87) PCT Pub. No.: WO2007/022780
PCT Pub. Date: Mar. 1, 2007

(65) Prior Publication Data
US 2009/0209710 A1 Aug. 20, 2009

(30) Foreign Application Priority Data
Aug. 26, 2005 (WO) ............... PCT/DE2005/000547
Mar. 2, 2006 (EP) ............................. 06075482

(51) Int. Cl.
*C08L 71/02* (2006.01)
(52) U.S. Cl. ................. 525/403; 424/78.17; 424/78.38; 514/716; 514/772.7; 514/788; 525/408; 525/523; 525/533; 525/540; 528/403; 528/407; 528/417; 528/420; 528/421; 528/422
(58) Field of Classification Search ............. 424/78.17, 424/78.38; 514/716, 772.7, 788; 525/403, 525/540, 523, 533; 528/403, 407, 417, 420, 528/421, 422; 530/345, 409, 410
See application file for complete search history.

(56) References Cited

U.S. PATENT DOCUMENTS

| 5,483,008 A * | 1/1996 | Sakurai et al. ............. 525/408 |
| 2001/0044526 A1 | 11/2001 | Shen |
| 2003/0083389 A1 | 5/2003 | Kao et al. |
| 2003/0161837 A1 | 8/2003 | Borel et al. |
| 2004/0115615 A1 | 6/2004 | Sorensen |
| 2005/0014903 A1 | 1/2005 | Kozlowski et al. |

FOREIGN PATENT DOCUMENTS

| EP | 0555101 | 8/1993 |
| EP | 1167418 | 1/2002 |
| FR | 2358394 | 2/1978 |
| JP | 2003268099 | 9/2003 |
| WO | WO-97/03106 | 1/1997 |
| WO | WO-99/01469 | 1/1999 |
| WO | WO-01/26692 | 4/2001 |
| WO | WO-2004/012773 | 2/2004 |

OTHER PUBLICATIONS

Roberts, M.J.; Bentley, M.D.; Harris, J.M.; Advanced Drug Delivery Reviews, 2002(54), p. 459-476.*
Zalipsky, S.; Bioconjugate Chemistry, 1995(6), p. 150-165.*
Zhang, S.; Du, J.; Sun, R.; Li, X.; Yang, D.; Zhang, S.; Xiong, C.; Peng, Y.; Reactive & Functional Polymers, 2003(56), p. 17-25.*
Rademann et al., J. Am. Chem. Soc., 121:5459-5466 (1999).
Loontjens et al., Polymer Bulletin, 30:489-494 (1993).
Huang et al., Journal of Polymer Science, 23:795-799 (1985).
Abraham et al., Proceedings of the 26th Annual International Conference of the IEEE EMBS, 26(VII):5036-5039 (2004).
Won, Polymer Bulletin, 52:109-115 (2004).
Manta et al., Enzyme and Microbial Technology, 33:890-898 (2003).
Kim et al., Polymer Bulletin, 33(1):1-6 (1994).
Zhang et al., Reactive & Functional Polymers, 56:17-25 (2003).
Kreppel et al., Molecular Therapy, 12(1):107-117 (2005).
DeLong et al., Biomaterials, 26:3227-3234 (2005).
Liu et al., Bioconjugate Chem., 11:755-761 (2000).
Yokoyama et al., Bioconjugate Chemistry, 3(4):275-276 (1992).
Lange et al., Memoires Presentes a La Societe Chimique, pp. 340-344 (1954).

* cited by examiner

*Primary Examiner*—David Wu
*Assistant Examiner*—Robert Jones, Jr.
(74) *Attorney, Agent, or Firm*—Edwards Angell Palmer & Dodge LLP; Peter F. Corless; Andrew W. Shyjan, Esq.

(57) ABSTRACT

The present application discloses a method of modifying a macromolecule, the method comprising the steps of (i) providing the macromolecule; (ii) providing a compound of the general formula (I):

$$\text{\textcircled{P}}-N{-}{\left[{-}{\left(CH_2\right)}_m{-}O{-}{\left(CHR_1{-}CHR_2{-}O\right)}_n\right]}{-}X \qquad (I)$$

wherein N is a primary amino group protected with the protecting group P, wherein the protecting group P involves both free valences of the primary amino group; m is an integer of 1-12 and n is an integer of 1-2000; $R^1$ and $R^2$ are independently selected from the group consisting of hydrogen and $C_{1-4}$-alkyl; and X is a reactive group; and (iii) allowing the compound of the general formula (I) to react with the macromolecule so as to form grafts on the macromolecule. Compounds of the general formula (i) and a method for the preparation thereof are also disclosed.

7 Claims, 1 Drawing Sheet

METHOD OF MODIFYING A MACROMOLECULAR SYSTEM

FIELD OF THE INVENTION

The invention relates to methods of modifying a macromolecule, in particular a polymer matrix, by functionalization with molecular entities comprising a reactive moiety, an alkylene oxide spacer arm and a functional group comprising a protected primary amine.

BACKGROUND OF THE INVENTION

There is a growing need for making specific functionalization of various macromolecular systems (in short macromolecules) including large biomolecules and polymeric materials. A primary amine is a very versatile functional group, which can be used both a starting point for various chemical reactions and for modifying the physiochemical properties of the macromolecular system.

For many applications, it is furthermore required to have the functional group attached to the macromolecular system via a long chemical spacer arm in order to ensure optimal access to the functional group. Poly- or oligo-alkylene oxides represent a family of molecular fragments that can be used for such functional arms, while exhibiting a high compatibility towards biological or chemical environments depending on the application.

The macromolecular systems where such molecular entities are useful for forming amine functionalized products include biological molecules such as proteins and nucleotides, beaded materials for peptide synthesis, resins for chromatography, polymeric materials for filtration, as well as surface layers for use in medicinal components, in vivo or in vitro diagnostic components, analytical systems, etc.

In the literature, there are a number of methods for introducing primary amines as functional groups on polymer resins used for applications such as solid phase synthesis or chromatography. Most of these methods attach the amine group on the polymer backbone either directly or via a short (less than 10 atom) linker. Examples of that is the direct reaction of a deprotonated phthalimide with a primary alkyl halide followed by hydrazinolysis of the imide, and the reaction of azide with alkyl halides or tosylates followed by reduction. Also the reaction of bromoethyl phthalimide with alkoxide moieties on the macromolecule followed by hydrazinolysis has proven useful in some cases. In some cases, the primary amine functionality has been obtained as a terminal functional group on a long alkoxide spacer arm attached to a polymer resin. In these cases, the primary amine—alkoxide spacer arm moiety is formed in a stepwise fashion i.e. the alkoxide spacer arm is attached followed by the attachment of the primary amine to the alkoxide spacer arm using reactions as described above. The chemistry involved in the methods described above requires quite harsh conditions which often are incompatible with the macromolecular systems. Especially biological macromolecules are degraded, but also resins used for chromatography can be harmed under such conditions. In the later case this is especially important for macroporous resins where the harsh condition will alter the porosity of the resins. In addition, the mentioned reactions rarely are quantitative, which give rise to undesired side products.

Examples of unsymmetrical alkylene oxides prepared from ethylene glycol in which one terminal group is an amine and one terminal group is a hydroxide do exist. These compounds mainly exist as short oligomeric versions where the separation from the symmetrical alkylene oxides is possible. Moreover, the high cost of producing these molecules and the difficulty in selectively converting the hydroxy functionality into a reactive group that can be reacted with a macromolecular system strongly limit the industrial applicability of these compounds for the functionalization of macromolecular systems.

Examples of unsymmetrical peg prepared by direct ethoxylation of an ethanolamine with a amide or imide protection group have been described in the literature.

Lange and Wahl (Bull. Chim. Soc. Fr. 1951, 340-342) described the ethoxylation of N-acetylethanoamine forming mono and diethoxylated derivatives. Lontjens et al. (Polym. Bull. 30, 1993 pp. 489-494) describe the synthesis of monoamino polyethylene glycols in a high temperature ethoxylation process, which does create a number of by-products. Y-I Huang (J. polym. Sci. 23, 1985, pp. 795-799) describe the ethoxylation of an ethanolamine-benzaldehyde Shiff-base followed by hydrolysis to the monoamine-substituted polyethylene glycol. In these last two examples, the product was reacted via the primary amine primary amine to form the polymeric entities leaving a free hydroxyl group. In no case, a primary amine derivative was obtained.

Thus, there is a need in the art for molecular entities, which allow the efficient and inexpensive functionalization of macromolecular systems with an alkoxide spacer arm and a primary amine functionality.

DESCRIPTION OF THE INVENTION

Figure 1:
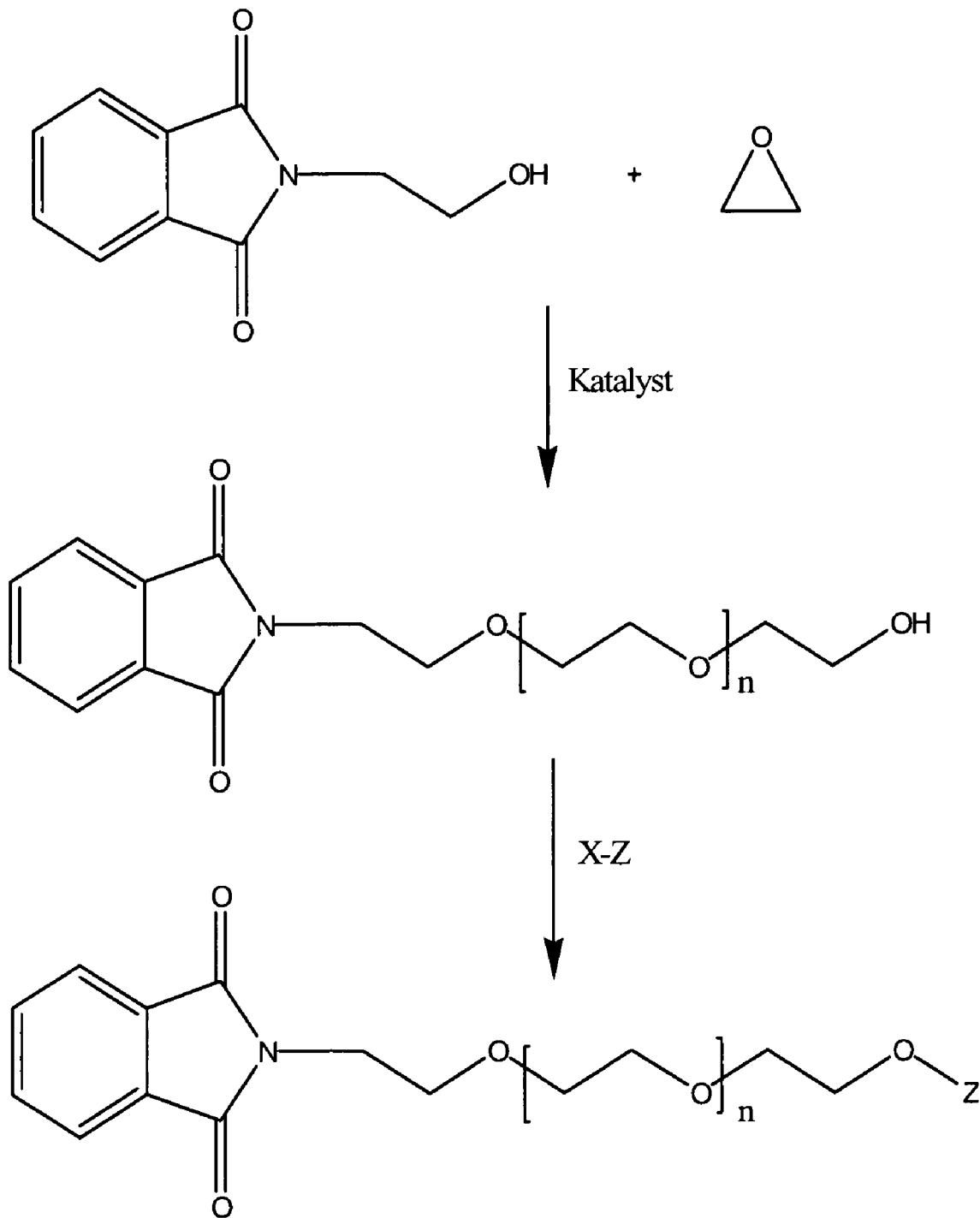
FIG. 1 illustrates the preparation of the compound of the general formula (I); m is 1, n in FIG. 1 corresponds to n−1 in formula (I), and Z in FIG. 1 corresponds to X in formula (I).

The present invention relates to a method of modifying a macromolecule, in particular a polymer matrix, e.g. polymer matrixes used as solid supports for synthesis as well as for chromatographic purposes.

In particular, the present invention relates to a method of modifying a macromolecule, in particular a polymer matrix, the method comprising the steps of (i) providing the macromolecule (e.g. polymer matrix);

(ii) providing a compound of the general formula (I):

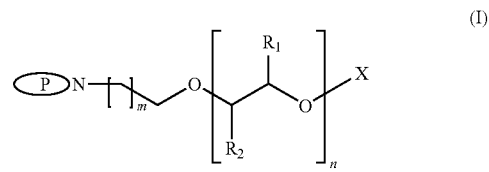

wherein

N is a primary amino group protected with the protecting group P, wherein the protecting group involves both free valences of the primary amino group;

m is an integer of 1-12 and n is an integer of 1-2000;

$R^1$ and $R^2$ are independently selected from the group consisting of hydrogen and $C_{1-4}$-alkyl; and X is a reactive group; and (iii) allowing the compound of the general formula (I) to react with the macromolecule (e.g. polymer matrix) so as to form grafts on said macromolecule.

Compounds of the General Formula (I)

The compound useful for the modification of macromolecules, in particular polymer matrixes, can be represented by compounds of the general formula (I):

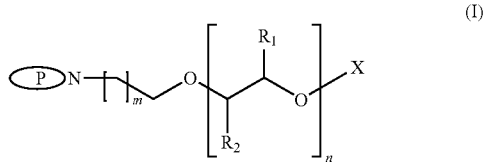

wherein

N is a primary amino group protected with the protecting group P, wherein the protecting group involves both free valences of the primary amino group;

m is an integer of 1-12 and n is an integer of 1-2000;

$R^1$ and $R^2$ are independently selected from the group consisting of hydrogen and $C_{1-4}$-alkyl; and X is a reactive group.

It will be appreciated that the compounds of the general formula (I) are of the "protected amino"-poly(oxyalkylene)-type. Hence, the methods are suitable for introducing into macromolecules (e.g. polymer matrixes) a primary amino group via a generally hydrophilic linker.

The compounds of the general formula (I) comprise a {P}-N moiety, representing a primary amino group protected with the protecting group P, wherein the protecting group involves both free valences of the primary amino group.

Protecting groups involving both free valences of the primary amino group are typically those of the imide type [(RC(=O))$_2$N-] and of the imine type [R—C=N—].

For example, protecting groups of the imide type may be those selected from succinic anhydrides/succinic acids (succinimides) and phthalic anhydrides/phthalic acids (phthalimides).

In one currently preferred embodiment, the protecting group is of the imide type. Currently most preferred protecting groups are succinic anhydride/succinic acids (succinimides) and phthalic anhydride/phthalic acids (phthalimides), in particular phthalic anhydride/phthalic acids (phthalimides).

m is an integer of 1-12, e.g. 1-6, such as 1-4, or 1-3, or 1-2, in particular 1. n is an integer of 1-2000, more typically 1-100, or 1-50, or 1-10 or 1-8, such as 1-6, or 1-5, or 1-4, or 1-3, 1-2, or 2-6, or 2-4, or 1.

$R^1$ and $R^2$ are independently selected from the group consisting of hydrogen and $C_{1-4}$-alkyl.

$C_{1-4}$-alkyl encompasses methyl, ethyl, 1-propyl, 2-propyl, 1-butyl, 2-butyl, tert-butyl and (2-methyl)-prop-1-yl.

Particular examples are those where $R^1$ and $R^2$ are independently selected from hydrogen and methyl, hence compounds having ethylene glycol and propylene glycol fragments. The currently most preferred embodiments are those where all of $R^1$ and $R^2$ are hydrogen, i.e. corresponding to compounds having ethylene glycol fragments.

The reactive group is designed to be capable of reacting with simple functionalities on the macromolecule (e.g. polymer matrix), e.g. amines, alcohol and thiol functionalities, possibly after activation of such groups. For this purpose, reactive groups containing small cyclic ether such as oxiranes (epoxides) and oxethanes can be used, but also functional groups such as isocyanates, carboxylic acids, acid chlorides or activated vinylic compounds may be used. Particular examples are reactive groups containing oxiranes and oxethanes of which a suitable oxirane-containing reactive groups (X) may be the one derived from epichlorohydrin (see Example 5). An alternative example of a reactive group is a carboxylic acid-containing reactive group, e.g. as illustrated in Example 7. For both of these examples, a $CH_2$ group is included as a part of the reactive group X, cf. $CH_2(O)$ $CHCH_2$— in Example 5 and $HOOCCH_2$— in Example 7.

Preparation of Compounds of the General Formula (I)

In a preferred embodiment of the invention, the molecular entity is formed via the polyalkoxylation of an N-protected hydroxy alkylamine, followed by the attachment of the reactive moiety via a C—O bond. This is a cost efficient route to unsymmetrical polyalkylene oxides, by careful selection of catalysts and reaction time the good control of chain length and purity can be obtained. Moreover, by varying the content of alkylene oxides such as ethylene oxide and propylene oxide the molecular structure and hydrophilicity of the product can be controlled.

Synthesis of Protected Polyethylenglycol-Alkylamines

The starting point for this synthesis is the protected hydroxy alkylamine (b). Examples of simple, useful alkyl amines include ethanolamine, 3-hydproxypropylamine, 2-hydroxypropylamine. Also more complex amines such as 3-oxy-5-hydroxy-1-pentanamine or 4-hydroxymethyl-benzylamine can be used.

The amine group on the hydroxyalkyl amine (a) is protected with a protecting group which allows the ethoxylation and subsequent attachment of the reactive moiety. Protection groups such as imides, amides, imines or urea derivatives are quite useful for this purpose. The phthalimide protected amine formed from ethanolamine and phthalic anhydride is commercially available in large scale. Compared with simple amide protection, it has the advantage that there are no hydrogen left on the nitrogen atom and as a result it is stable towards nuclephilic attack in subsequent transformations. This is particularly important since the amide proton in regular amide protected amines has a similar acid strength as the terminal hydroxy group in the polyalkoxide, which gives rise to ill defined substitution reactions.

Once the amine group is protected, the free hydroxy group can be reacted with oxiranes in presence of a catalyst to form the polyalkoxy derivative (c). Commonly used oxiranes include ethyleneoxide and propyleneoxide or mixtures thereof. The selection of catalyst and the reaction conditions are particularly important. The conditions previously reported for the reaction between 2-hydroxyethylphthalimide and ethyleneoxide involve high sodium hydroxide catalyst concentrations and temperatures above 160° C., conditions which invariably give rise to highly colored products with a large molecular weight variations and high levels of impurities. As exemplified in this patent lowering of the temperature and the concentration of catalyst give products of acceptable purity. Application of lanthanum or lanthanide based catalysts give very pure, almost colorless products, with narrow molecular weight distribution.

Polyalkoxides based on ethyleneoxide are very hydrophilic and biocompatible. Use of propylene oxide instead of ethylene oxide results in molecules that are comparatively less soluble in water and exhibits some degree of hydrophobic interaction with biomolecules. The two monomers can be copolymerised to tailor the hydrophilicity even further.

The polyalkoxy derivative is then functionalized with a reactive moiety to form the desired molecular entity, which is used to modify macromolecular systems. The reactive moiety should be able to react with functional groups on the macromolecular system such as amines, alcohols, thioles, etc. as discussed above.

The present invention provides—in one embodiment—a method for the preparation of a compound of the general formula (I)

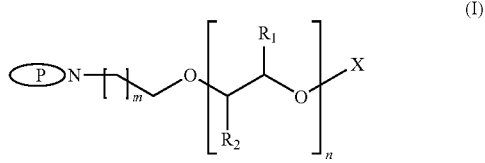

wherein {P}-N is a phthalimido group, m is an integer of 1-12, n is an integer of 1-2000, $R^1$ and $R^2$ are both hydrogen, and X is a reactive group, said method comprising the steps of:

(a) providing a phthalimido N-protected α-hydroxy-ω-amino-$C_{2-13}$-alkane;

(b) reacting said alkane with ethylene oxide in the presence of a catalyst; and (c) converting of functionalizing the terminal OH group of the product obtained in step (b).

The reaction in step (b) is preferably conducted in the absence of atmospheric air (in particular oxygen). Moreover, the reaction is typically conducted under pressure, e.g. 2-10 bar, and at elevated temperature, e.g. 80-200° C., such as 100-190° C. The amount of catalyst is typically 0.1-3% based on the amount of phthalimido N-protected α-hydroxy-ω-amino-$C_{2-13}$-alkane, where the necessary amount correlates with the equivalents of ethylene oxide used, i.e. the more equivalents ethylene oxide used, the higher the amount of catalyst. The number of equivalents of ethylene oxide used corresponds to the desirable chain length, i.e. the number "n" in the general formula (I). Suitable catalysts are, e.g., those selected from NaOH, KOH, $KOCH_3$, MEO-3, and MEO-LA.

The conversion i step (c) is conducted in order to introduce the reactive group X, either coupling of a reactive group to the molecule via the oxygen atom, or by converting the terminal hydroxyl functionality, e.g. by oxidation to the corresponding carboxylic acid. This is illustrated in the Examples section.

Grafting of a Compound of the General Formula (I) onto Macromolecules

The complete molecular entity is then used to modify macromolecular systems (macromolecules) such as polymer matrixes, biomolecules (enzymes, proteins, etc.), and materials surfaces. In the cases where the reactive group on the macromolecular system is an amine group, the reaction will quite often proceed without a catalyst whereas some catalysts are often needed in the reaction with hydroxyl groups (i.e. alcohols).

Illustrative examples of suitable polymer matrixes are those selected from PS, POEPS, POEPOP, SPOCC, PEGA, CLEAR, HYDRA, PEG-polyacrylate copolymers, poly-ether-polyamine copolymers, and cross-linked polyethylene di-amines, Expansin, Polyamide, Jandagel, PS-BDODMA, PS-HDODA, PS-TTEGDA, PS-TEGDA, GDMA-PMMA, PS-TRPGDA, ArgoGel, Argopore resins, Toyopearl, other cross-linked polyacrylates high capacity PEGA, Fractogel, Sephadex, Sepharose, other cross-linked agaroses, and derivatives of the aforementioned.

In a final step, the protection group of the terminal primary amine on the alkoxide side-chain may be removed. Phthalimide protection groups are removed by treatment with solutions containing hydrazine or ethylenediamine, whereas imine type protection groups can be hydrolyzed under even milder conditions using low concentrations of acids or bases in water. Amide type protection groups most often require strong base treatment at elevated temperatures and are thus less favorable.

Using the above procedure, macromolecular systems can be rendered functional side-arms of desired hydrophilicity with an easily accessible primary amine as an end group. Such macromolecular systems may be used as such or modified further via chemical modification of the amine group.

The amine group may be used as a starting point for solid phase chemistry or may be used as an attachment point for more complex molecules, such as proteins, nucleotides or affinity ligands.

In summary, the invention consists in the formation of specific molecular entities and the use of these entities for the modification of macromolecular systems. The formation consists of 4 steps:

1. Alkoxylation of a N-protected hydroxy alkyl amine.
2. Attachment of an reactive moiety via the free hydroxy terminal of the polyalkyleneoxide.
3. Reaction of the reactive moiety with functional groups of the macromolecular system.
4. Removal of the N-protective group in order to release a primary amine.

Specific Embodiments

In a particular embodiment, the present invention relates to a method of modifying a macromolecule, in particular a polymer matrix, the method comprising the steps of (i) providing the macromolecule (e.g. polymer matrix);

(ii) providing a compound of the general formula (I):

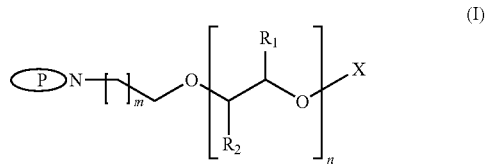

wherein

{P}-N is a phthalimido group;

m is 1 and n is an integer of 1-100;

$R^1$ and $R^2$ are both hydrogen; and

X is a reactive group, such as selected from oxethane-containing reactive groups and oxirane-containing reactive groups, in particular oxethane-containing reactive groups or oxirane-containing reactive groups; and (iii) allowing the compound of the general formula (I) to react with the macromolecule (e.g. polymer matrix) so as to form grafts on said macromolecule.

In a further particular embodiment, the invention provides a compound of the general formula (I):

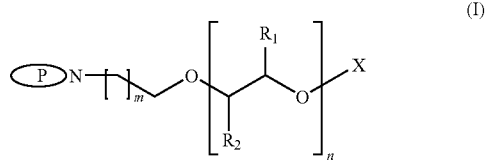

wherein

{P}-N is a phthalimido group;

m is 1 and n is an integer of 1-100;

$R^1$ and $R^2$ are both hydrogen; and

X is an oxethane-containing reactive group or an oxirane-containing reactive group.

In these embodiments, X preferably represents $CH_2(O)CHCH_2$— (oxiranyl-methyl).

Alternative Embodiments

Although the macromolecules referred to herein are mostly based on skeletons derived from organic molecules, it is—in alternative embodiment—envisaged that the method defined herein may be useful for modifying glass substrates (e.g. plates, beads, sticks, etc.). In such instances, the reactive group (X in the compound of the general formula (I)) should be capable of reacting with Si—OH surface groups of the glass substrate in question or surface groups of already derivatised glass substrates. Hence, a suitable reactive group will often be of the silane type.

In a further alternative, it is envisaged that the reactive group X of the compound of the general formula (I) may simply be an electron pair, i.e. that —$CH_2$—O—X is —$CH_2$—O—, corresponding to a deprotonated terminal —$CH_2$—OH group of the polyalkyleneoxide chain. Such a reactive group may, e.g., react with epoxide groups of the macromolecule.

EXAMPLES

Example 1

Alkoxylation of N-(2-hydroxyethyl)-phthalimide

The synthesis was performed in a 3 liter autoclave equipped with heating mantle, internal cooling coil and mechanical stirrer.

The catalyst was added to 300 g of N-(2-hydroxyethyl)-phthalimide (HPI, Katwijk Chemie bv, NL). The reactor charge was dried at 130° C. by nitrogen purge for 20 minutes. Afterwards, ethylene oxide was added at the selected temperature in a way to keep the overpressure at the level between 3-5 bar. (See table below). After introduction of 640 g ethylene oxide (EO), the product was cooked out 30 minutes at the reaction temperature. The obtained ethoxylate was discharged at 40° C. and weighed.

Example 2

Fictionalization of Alkoxylated N-(2-hydroxyethyl)-phthalimide with Epichlorhydrin The alkoxylated N-(2-hydroxyethyl)-phthalimide prepared as described in Example 1 using the MEO-3 catalyst was dried by azeotropic evaporation of acetonitrile (5 mL/g PEG, 2×) and dissolved in THF (5 mL/g PEG) with stirring and exclusion of moisture. Sodium hydride [60 wt % dispersion in mineral oil] was added in small portions to the PEG-solution with stirring and exclusion of moisture. The deprotonation reaction was stirred at room temperature for 2 h. Epichlorohydrin was added dropwise and the reaction was stirred at 40° C. for 12 h. The solvent was evaporated in vacuo and the residue was mixed with acetonitrile (25 mL). The precipitated sodium salt was separated by centrifugation at 8000 r.p.m. for 20 min and the supernatant was decanted and evaporated in vacuo. The products were washed with heptane (3×25 mL) to remove mineral oil and dried under high vacuum.

Example 3

Grafting onto a Polymer Matrix

The product of Example 2 is grafted onto a polymer matrix as in Example 9.

Example 4

Hydrolysis of a Phthalimide Derivatised Polymer Matrix

The polymer matrix obtained in Example 3 is washed in a glass filter funnel with 150 mL methanol followed by the washing with 150 mL butanol. After draining off the solvent, another 50 mL of butanol is added to the beaker and left at room temperature for 2 h. The butanol is drained off and the resin is placed in a round bottom flask. To the resin, 11 mL of ethylene diamine is added followed by the addition of 30 mL of butanol. The mixture is stirred and heated to 90° C. for 15 h under inert atmosphere. The resultant product is washed with water followed by 0.5 M HCl until the pH is approx. 1-2. The resin is then drained from solvent and covered with 2 M HCl. The mixture is stirred and heated to 90° C. for 2 h. Finally, the resin is washed thoroughly with 1 M NaOH followed by water.

|   | Catalyst | Amount | Temperature | EO eq. | Yield | Purity | Appearance |
|---|---|---|---|---|---|---|---|
| 1 | NaOH | 0.5 g | 170° C. | 15.7 | 970 g | +85% | Brown liq. |
| 2 | KOH | 5 g | 160° C. | App. 15 | 950 g | ~50% | Dark brown liq. |
| 3 | $KOCH_3$ | 1.6 g | 130° C. | 15.2 | 970 g | +60% | Brown liq |
| 4 | MEO-3 | 1.5 g | 130° C. | 14.5 | 940 g | +95% | Light tan liq. |
| 5 | MEO-LA | 0.9 | 140° C. | 2.5 | 470 g | +95% | Tan liq. |
| 6 | MEO-LA | 2.0 g | 140° C. | 10 | No data | +95% | Tan liq. |
| 7 | MEO-LA | 2.9 g | 140° C. | 33.6 | 2600 g | No data | Hard cream coloured solid |

The MEO-3 and the MEO-LA catalysts are heterogeneous Lanthanum catalysts developed by Mexeo, Pl.
Purities are estimated on the basis of Maldi Tof spectra.

Example 5

Preparation of Oxirane-PEG Phthalimide

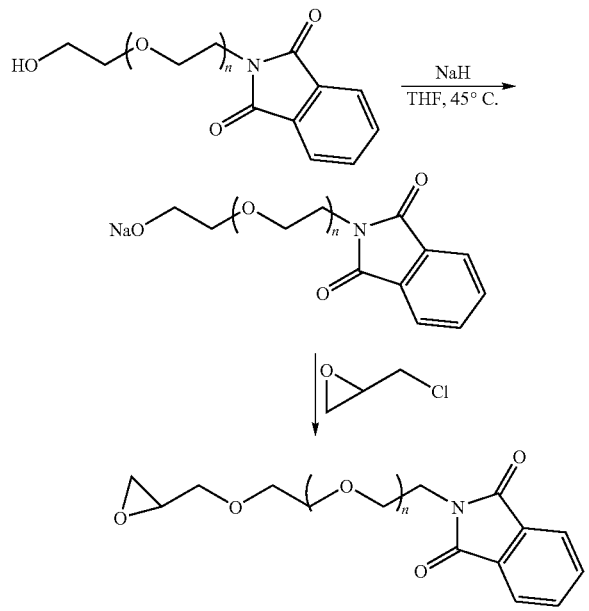

Dissolve PEG-phthalimide prepared as described in Example 1 using the MEO-3 catalyst (1 equiv) in THF (5 mL) and add sodium hydride (60% oil) (1 equiv) with stirring. After 6 h, add epichlorohydrin (1.5 equiv) drop wise to the reaction mixture at 45° C. and allowed to stir for 16 h. Add DCM to the reaction mixture, filter off the insoluble impurities. Evaporate the solvent in vacuum to yield the product.

Example 6

Preparation of VO-2000-PEG-amine

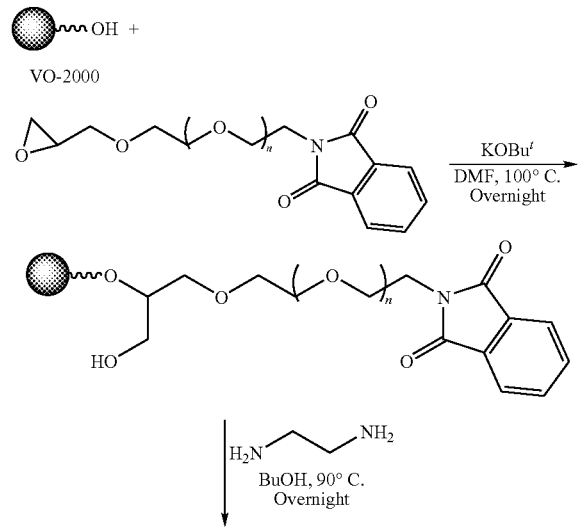

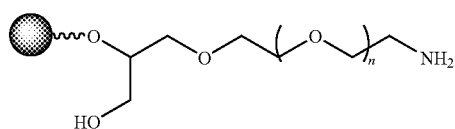

VO-2000 resin (An oxethane cross-linked PEG based resin commercialized by VersaMatrix A/S) (0.5 mmol OH) washed with DMF and add KOBu$^t$ (4 equiv) in DMF (5 mL). Keep the reaction mixture at 100° C. and flush with argon. Add oxirane-PEG phthalimide prepared as described in Example 1 using the MEO-3 catalyst (4 equiv) in DMF (5 mL) to the reaction mixture and the reaction allowed to continue for overnight. Filter off the resin, wash with DMF, ethanol, water, ethanol and butanol. Add ethylenediamine (5 equiv) to the resin in butanol and keep the reaction mixture at 90° C. for overnight. Wash the resin with butanol, ethanol, water, ethanol, DMF and DCM.

Analysis: Kaiser test is positive.

Loading: Fmoc-Gly-OH was attached to the resin with TBTU/NEM activation method. The Fmoc group on the pre-weighed resin was cleaved off with 20% piperidine in DMF and the absorbance of the piperidine-fulvene adduct measured at 290 nm and the amino loading of the resin calculated from the OD value. Measured loading=0.69 mmol/g

Example 7

Preparation of Carboxyl PEG-phthalimide

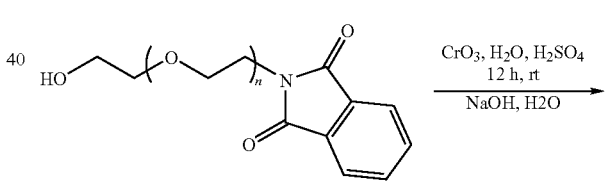

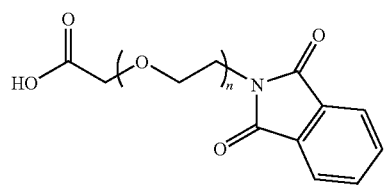

Dissolve PEG-phthalimide prepared as described in Example 1 using the MEO-3 catalyst (1 equiv) in 25 mL water/8 mL conc. $H_2SO_4$ and add $CrO_3$ in 5 mL water. Stir the solution for 16 h at room temperature. Add 25 mL of water to the reaction mixture and extracted with DCM (3×). Combine the organic layers and washed with water (2×) and saturated NaOH (2×) and dry the organic fraction over $Na_2SO_4$ and concentrate in vacuum.

Example 8

Preparation of VA-1900PEG-amine

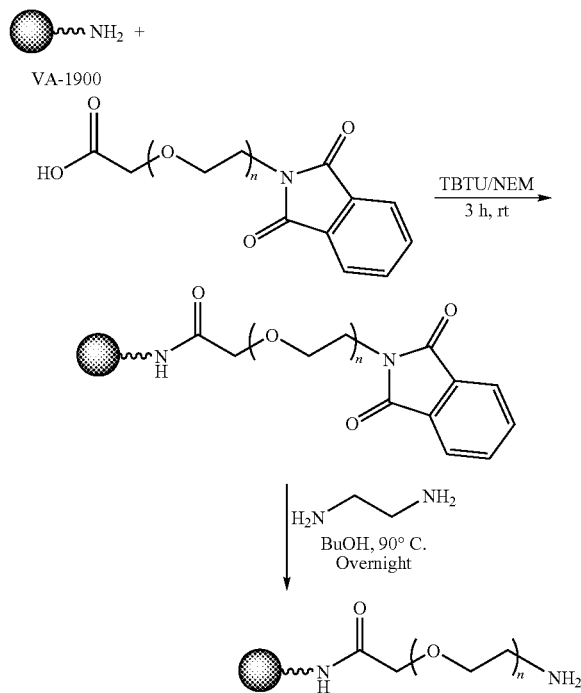

VA-1900 resin (An acrylamide cross-linked PEG based resin with average PEG chain length is 1900 Dalton commercialized by VersaMatrix A/S) (0.017 mmol NH₂) washed with DMF and add carboxyl-PEG phthalimide prepared as described in Example 7 (10 equiv), TBTU (9.6 equiv) and NEM (13.3 equiv) in DMF to the resin and the reaction allowed to continue for 3 h. Filter off the resin, wash with DMF, ethanol, water, ethanol and butanol. Add ethylenediamine (5 equiv) to the resin in butanol and keep the reaction mixture at 90° C. for overnight. Wash the resin with butanol, ethanol, water, ethanol, DMF and DCM.

Analysis: Kaiser test is positive.

Loading: Fmoc-Gly-OH was attached to the resin with TBTU/NEM activation method. The Fmoc group on the pre-weighed resin was cleaved off with 20% piperidine in DMF and the absorbance of the piperidine-fulvene adduct measured at 290 nm and the amino loading of the resin calculated from the OD value. Measured loading=0.27 mmol/g

Example 9

Derivatization of Acrylate Resin 15 mL epoxyacrylate resin was washed with distilled water, ethanol and THF and surplus THF were removed by suction. 11.4 g PEG-phthalimide (4 equiv) was dissolved in 6 mL THF and 720 mg sodium hydride (4 equiv) was added. The reaction was violent creating lot of foam. The solution was then added to the resin+4 mL THF. The coupling proceeded at 45 degrees overnight. The resin was washed with THF, ethanol, water, ethanol and finally butanol. 1.5 mL ethylenediamine was added to 9 mL butanol and added to the resin. The reaction proceeded at 90 degrees overnight. The resin was washed with butanol, ethanol and water.

Analysis: A Kaiser test was performed on a few beads and turned blue and positive indicating the presence of primary amines on the resin.

Loading: 15 mL amino-PEG-resin was washed with water, ethanol and DMF but interstitial DMF was not removed by suction. Fmoc-Gly 5.35 g (4 equiv.) and TBTU 5.78 g (4 equiv) and NEM 2.27 mL (4 equiv) were mixed in 18 mL and added to the resin. The coupling was performed at room temperature over the weekend. After the weekend, a 100 μL aliquot of beads was taken out for Fmoc-loading test which gave a loading of 307 μmol NH₂/g dry resin.

The invention claimed is:

1. A method of modifying a macromolecule, the method comprising the steps of
   (i) providing the macromolecule;
   (ii) providing a compound of the general formula (I):

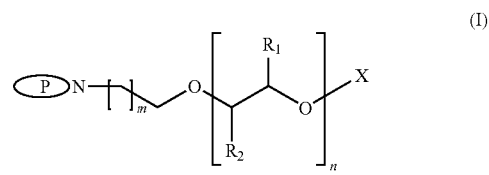

wherein

N is a primary amino group protected with the protecting group P, wherein the protecting group involves both free valences of the primary amino group;

m is an integer of 1-12 and n is an integer of 1-2000;

$R^1$ and $R^2$ are independently selected from the group consisting of hydrogen and $C_{1-4}$-alkyl; and X is a reactive group selected from oxethane-containing reactive groups and oxirane-containing reactive groups; and;
   (iii) allowing the compound of the general formula (I) to react with the macromolecule so as to form grafts on the macromolecule.

2. The method according to claim 1, wherein the macromolecule is a polymer matrix.

3. The method according to claim 1 wherein the protecting group {P}-N is a phthalimido group.

4. The method according to claim 1 wherein the protecting group {P}-N is a phthalimido group, m is 1, n is 1-10 and X is selected from oxethane-containing reactive groups and oxirane-containing reactive groups.

5. A method according to claim 1, comprising the steps of
   (i) providing the macromolecule;
   (ii) providing a compound of the general formula (I):

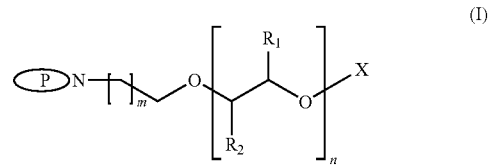

wherein
{P}-N is a phthalimido group;
m is 1 and n is an integer of 1-100;
$R^1$ and $R^2$ are both hydrogen; and
X is a reactive group, such as selected from oxethane-containing reactive groups and oxirane-containing reactive groups; and
  (iii) allowing the compound of the general formula (I) to react with the macromolecule so as to form grafts on said macromolecule.

6. A compound of the general formula (I):

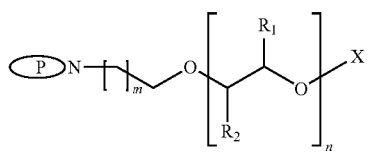

wherein
{P}-N is a phthalimido group;
m is 1 and n is an integer of 1-100;
$R^1$ and $R^2$ are both hydrogen; and
X is an oxethane-containing reactive group or an oxirane-containing reactive group.

7. A method for the preparation of a compound of the general formula (I)

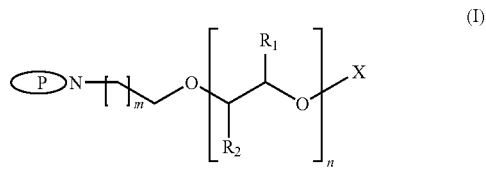

wherein {P}-N is a phthalimido group, m is an integer of 1-12, n is an integer of 1-2000, $R^1$ and $R^2$ are both hydrogen, and X is a reactive group selected from oxethane-containing reactive groups and oxirane-containing reactive groups, said method comprising the steps of:
  (a) providing a phthalimido N-protected α-hydroxy-ω-amino-$C_{2-13}$-alkane;
  (b) reacting said alkane with ethylene oxide in the presence of a catalyst; and
  (c) converting of functionalizing the terminal OH group of the product obtained in step (b).

* * * * *